United States Patent
Lee et al.

(10) Patent No.: US 8,493,914 B2
(45) Date of Patent: Jul. 23, 2013

(54) METHOD AND APPARATUS FOR TRANSMITTING RECORDING INFORMATION FOR UPLINK TRANSMISSION IN MULTI BASE STATION MIMO SYSTEM

(75) Inventors: Wook Bong Lee, Gyeonggi-do (KR); Bin Chul Ihm, Gyeonggi-do (KR); Jin Young Chun, Gyeonggi-do (KR); Ja Ho Koo, Gyeonggi-do (KR); Sung Ho Park, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 406 days.

(21) Appl. No.: 12/888,570

(22) Filed: Sep. 23, 2010

(65) Prior Publication Data

US 2011/0090882 A1 Apr. 21, 2011

Related U.S. Application Data (60) Provisional application No. 61/253,035, filed on Oct. 19, 2009.

(30) Foreign Application Priority Data

Mar. 26, 2010 (KR) .................. 10-2010-0027359

(51) Int. Cl.
*H04W 4/00* (2009.01)
(52) U.S. Cl.
USPC ....................................... 370/328
(58) Field of Classification Search
None
See application file for complete search history.

(56) References Cited

U.S. PATENT DOCUMENTS

| | | | |
|---|---|---|---|
| 2008/0075037 A1* | 3/2008 | Guo et al. | 370/329 |
| 2008/0188190 A1* | 8/2008 | Prasad et al. | 455/114.3 |
| 2010/0002643 A1* | 1/2010 | Han et al. | 370/329 |
| 2011/0019613 A1* | 1/2011 | Han et al. | 370/328 |
| 2011/0065465 A1* | 3/2011 | Kim et al. | 455/502 |
| 2011/0080901 A1* | 4/2011 | Lin et al. | 370/344 |
| 2011/0150132 A1* | 6/2011 | Kim et al. | 375/296 |
| 2011/0222615 A1* | 9/2011 | Kuo et al. | 375/260 |
| 2012/0147992 A1* | 6/2012 | Yang et al. | 375/296 |

OTHER PUBLICATIONS

Wookbong Lee, Bin-Chul Ihm, Rong Ran, Wooram Shin, "Text Change proposal for UL Multi-BS MIMO section (15.5.2)", IEEE 802.16 Broadband Wireless Access Working Group, Nov. 16, 2009, entire document.*
Song, Codebook-Based Combination Precoding Across Multiple BSs, IEEE C802.16m-09/0153, pp. 1-5, Jan. 2009.
Xiao, Coordinated Multipoint Transmission Systems with the Clustered Super-cell Structure Configuration, 5th International Conference on Wireless Communications, Networking and Mobile Computing, pp. 1-4, Sep. 2009.
Lee, Modifications on Interference Mitigation DG Harmonized Text Proposal, IEEE C802.16m-09/1609, pp. 1-3, Jul. 2009.
International Search Report for PCT/KR2010/006133.

* cited by examiner

*Primary Examiner* — Suk Jin Kang
(74) *Attorney, Agent, or Firm* — Morgan, Lewis & Bockius LLP (57) ABSTRACT

A PMI combination ratio (PCR) being used for generating a uplink precoding matrix W is transmitted by a base station to a mobile station. Using the PCR, a PMI maximizing transmission performance and $PMI_{Min}$ minimizing interference to a neighboring base station are combined into the uplink precoding matrix W. Overall operations of a system can be simplified and the load of calculation for generating the uplink precoding matrix W in the mobile station can be reduced, because the PCR is provided by the base station.

16 Claims, 6 Drawing Sheets

METHOD AND APPARATUS FOR TRANSMITTING RECORDING INFORMATION FOR UPLINK TRANSMISSION IN MULTI BASE STATION MIMO SYSTEM

CROSS-REFERENCE TO RELATED APPLICATIONS

This application claims the benefit of the U.S. Provisional Patent Application No. 61/253,035, filed on Oct. 19, 2009, and Korean Patent Application No. 10-2010-27359, filed on Mar. 26, 2010, which are hereby incorporated by reference as if fully set forth herein.

BACKGROUND OF THE INVENTION

1. Field of the Invention

The present invention relates to a wireless communication system, and more particularly, to an apparatus for transmitting precoding information for an uplink transmission in a wireless communication system supporting multiple base station uplink MIMO and method thereof.

2. Discussion of the Related Art

In the following description, described is a method of transmitting and receiving feedback information in consideration of an uplink channel status of a user equipment.

In a communication system, a receiving stage transmits feedback information on a signal received from a transmitting stage to enable efficient communications. The transmitted feedback information is schematically explained as follows by taking an example for a MIMO communication system.

Figure 1:
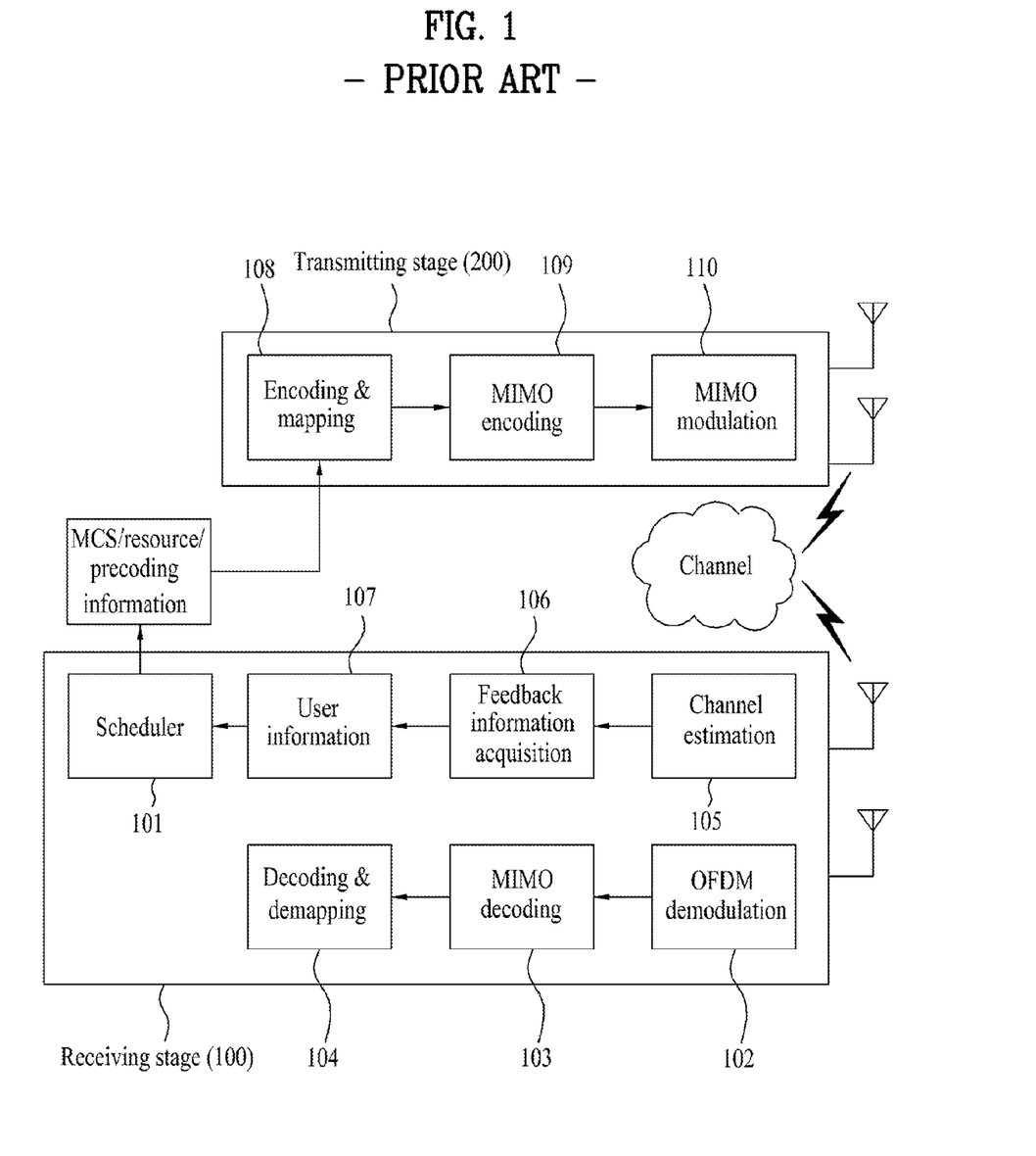
FIG. 1 is a block diagram of configurations of transmitting and receiving stages of a MIMO communication system according to a related art, in which information fed back from the receiving stage is shown.

FIG. 1 is a block diagram of configurations of transmitting and receiving stages of a MIMO communication system according to a related art, in which information fed back from the receiving stage is shown.

Referring to FIG. 1, a scheduler 101 of a receiving stage 100 delivers information for allocating a transmission signal to a proper communication resource using information on a reference signal received from a transmitting stage 200. In this case, the delivered information includes information on MCS (modulation and coding scheme) level, resource and precoding information. Afterwards, the transmission signal is transmitted on a channel via an encoding and mapping 108, an MIMO encoding 109 and an OFDM modulation 110. Meanwhile, the receiving stage 100 receives this transmitted signal and then performs a process reverse to the former process performed by the transmitting stage on the received signal. In particular, the transmitted information is acquired from processes of an OFDM demodulation 102, an MIMO decoding 103, and decoding and demapping 104. Moreover, the receiving stage 100 performs a channel estimation 105 using an OFDM demodulated signal and then acquires feedback information 106 to feed back the estimated channel response to the transmitting stage. The feedback information configures user information 107 and is then fed back to the transmitting stage 200 via the scheduler 101, as shown in FIG. 1.

The information fed back by the receiving stage 100 is classified into OFDM relevant feedback information and MIMO relevant feedback information and is then described as follows.

First of all, based on a measured channel quality information (hereinafter abbreviated CQI) and a channel state information (e.g., SINR (signal to interference and noise ratio), SNR (signal to noise ratio), etc.), a base station determines resource allocation and MCS (modulation and coding scheme) level.

Meanwhile, MIMO OFDM systems can be classified into an open loop (hereinafter abbreviated OL) type and a close loop (hereinafter abbreviated CL) type.

Regarding the codebook based CL-MIMO, a base station estimates a PMI optimal to a current channel status. A modulation order and coding rate vary according to the estimated PMI. Generally, a base station selects a PMI enabling best performance from PMIs applied to the same channel. The base station transmits information on modulation and coding to a user equipment (hereinafter abbreviated UE) together with the selected PMI. The user equipment then performs transmission to be suitable for the received information. The user equipment determines a precoding matrix to apply to an uplink transmission using the PMI information and the like. The user equipment is then able to perform the uplink transmission by applying the determined precoding matrix thereto.

In the MIMO system, it is able to determine the number of ranks applicable according to each channel status. For this, a base station is able to inform a UE of the number of ranks most efficient for the transmission in a channel status of the base station.

As mentioned in the foregoing description, the MIMO system is operable OL or CL. The MIMO system selects to use the OL in fast situation. The MIMO system selects to use the CL in slow situation. For this, the base station selects the OL or CL mode and is then able to inform the UE of the selected mode.

In CL MIMO precoding is applied, it is able to perform single base station precoding in multiple base station environment in a manner that two PMIs (precoding matrix indexes) are combined together in TDD (time division duplex) or FDD (frequency division duplex) uplink transmission to mitigate inter-cell interference.

However, in an uplink MIMO system, when a single base station precoding is performed in a multiple base station environment, how to set a precoding to optimize system performance becomes a problem.

SUMMARY OF THE INVENTION

Accordingly, the present invention is directed to an apparatus for transmitting precoding information for an uplink transmission in a wireless communication system supporting multiple base station uplink MIMO and method thereof that substantially obviates one or more of the problems due to limitations and disadvantages of the related art.

An object of the present invention is to provide an apparatus for transmitting precoding information for an uplink transmission in a wireless communication system supporting multiple base station uplink MIMO and method thereof, by which precoding information for uplink transmission is transmitted.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of base station's transmitting a precoding information, which is for an uplink transmission in a wireless communication system supporting multiple base station uplink MIMO (multiple input multiple output), includes the steps of: determining a PMI (precoding matrix index) for maximizing transmission performance between a mobile station and the base station, receiving a $\text{PMI}_{Min}$ for minimizing interference between the mobile station and a neighboring base station from the neighboring base station, and transmitting the PMI, the $\text{PMI}_{Min}$, and a PMI combination ratio (PCR) being used in combining the PMI and the $\text{PMI}_{Min}$ for generating a uplink precoding matrix W.

To further achieve these and other advantages and in accordance with the purpose of the present invention, a method of mobile station's determining a precoding matrix for uplink transmission in a wireless communication system supporting multiple base station uplink MIMO (multiple input multiple output) includes the steps of: receiving from a serving base station a PMI (precoding matrix index) for maximizing transmission performance between the mobile station and the serving base station, a $\text{PMI}_{Min}$ for minimizing interference between the mobile station and a neighboring base station, and a PMI combination ratio (PCR) being used in combining the PMI and the $\text{PMI}_{Min}$; and generate a uplink precoding matrix W using the PMI, the $\text{PMI}_{Min}$ and the PCR.

To further achieve these and other advantages and in accordance with the purpose of the present invention, a base station in a wireless communication system supporting multiple base station uplink MIMO (multiple input multiple output) includes: a receiving unit configured to receive a $\text{PMI}_{Min}$ for minimizing interference between a mobile station and a neighboring base station from the neighboring base station; a processing unit, electrically connected to the receiving unit, configured to determine a PMI (precoding matrix index) for maximizing transmission performance between the mobile station and the base station; and a transmitting unit, electrically connected to the processing unit, configured to transmit to the mobile station the PMI, the $\text{PMI}_{Min}$, and a PMI combination ratio (PCR) being used in combining the PMI and the $\text{PMI}_{Min}$ for generating a uplink precoding matrix W, under control of the processing unit.

To further achieve these and other advantages and in accordance with the purpose of the present invention, in a wireless communication system supporting multiple base station uplink MIMO (multiple input multiple output), a mobile station includes: a receiving unit configured to receive from a serving base station a PMI (precoding matrix index) for maximizing transmission performance between the mobile station and the serving base station, a $\text{PMI}_{Min}$ for minimizing interference between the mobile station and a neighboring base station, and a PMI combination ratio (PCR) being used in combining the PMI and the $\text{PMI}_{Min}$; and a processing unit configured to determine a uplink precoding matrix W using the PMI, the $\text{PMI}_{Min}$ and the PCR.

In each of the methods, the base station and the mobile station, uplink data is precoded with the uplink precoding matrix W, and transmitted from the mobile station.

In each of the methods, the base station and the mobile station, the PCR satisfies $0 \leq \text{PCR} \leq 1$.

In each of the methods, the base station and the mobile station, the uplink precoding matrix W can determined using the following equation:

$$W = \frac{PCR \cdot W_{PMI} + (1 - PCR) \cdot W_{PMI_{Min}}}{\|PCR \cdot W_{PMI} + (1 - PCR) \cdot W_{PMI_{Min}}\|},$$

where the $W_{PMI}$ indicates a precoding matrix corresponding to the PMI, and the $W_{PMI_{Min}}$ indicates a precoding matrix corresponding to the $\text{PMI}_{Min}$.

In each of the methods, the base station and the mobile station, the PMI for maximizing the transmission performance is received via a control information element and the PMI for minimizing the interference and the PCR are received via a MAC (media access control) message.

According to embodiments of the present invention, in determining an uplink precoding matrix, operations in a serving base station and user equipment are simplified, whereby overall performance of system can be enhanced.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Embodiments of the present invention are supportable by standard documents disclosed in at least one of wireless access systems including IEEE 802 system, 3GPP system, 3GPP LTE system and 3GPP2 system. In particular, the steps or parts, which are not explained to clearly reveal the technical idea of the present invention, in the embodiments of the present invention can be supported by the above documents. Moreover, all terminologies disclosed in this document can be supported by the standard documents.

In the following description, specific terminologies used for embodiments of the present invention are provided to help the understanding of the present invention. And, the use of the specific terminology can be modified into another form within the scope of the technical idea of the present invention.

According to the present invention, if a terminology called a base station is used as a regional concept, it can be called a cell or sector. A serving base station (or cell) can be regarded as a base station that provides a user equipment with a major service. In a sense, the serving base station (or a serving cell) can be named an anchor base station (or an anchor cell).

Generally, a transmission signal transmitted by a transmitting stage can be represented as Formula 1 in the following.

$$Y=HWx+I+N \qquad \text{[Formula 1]}$$

In Formula 1, the H indicates a channel between a transmitter and a receiver, the W indicates a precoding matrix to multiply in transmitting a data symbol from a transmitter, the x indicates a data symbol to transmit, the I indicates an interference, and the N indicates a noise of a receiver.

Particularly, the following description is made with reference to uplink.

First of all, assume that there are two mobile stations (e.g., a mobile station A (MS-A), a mobile station B (MS-B)) and two base stations (e.g., a base station A (BS-A), a base station B (BS-B)). If each of the mobile stations transmits a signal to each of the base stations, a reception signal received by the base station A can be represented as Formula 2 in the following.

$$y=H_{MS\text{-}AtoBS\text{-}A}W_{MS\text{-}A}x_1+H_{MS\text{-}BtoBS\text{-}A}W_{MS\text{-}B}x_2+N \qquad \text{[Formula 2]}$$

In Formula 2, the $H_{MS\text{-}AtoBS\text{-}A}$ indicates a channel from a mobile station A to a base station A, the $H_{MS\text{-}BtoBS\text{-}A}$ indicates a channel from a mobile station B to a base station A, the $W_{MS\text{-}A}$ indicates a precoding matrix of a mobile station A, and the $W_{MS\text{-}B}$ indicates a precoding matrix of a mobile station B.

In this case, how to select the $W_{MS\text{-}B}$ may affect reception performance of the base station A. Therefore, if the $W_{MS\text{-}B}$ meeting Formula 3 is selected, it is able to minimize the influence given to the base station A by the mobile station B.

$$PMI_{Min} = \operatorname*{argmin}_{i} \|(H_{MS-BtoBS-A} W_i)\|^2 \qquad \text{[Formula 3]}$$

On the contrary, when the mobile station B transmits a signal to the base station B, a precoding matrix meeting Formula 4 should be selected to obtain best performance.

$$PMI = \operatorname*{argmax}_{i} \|(H_{MS-BtoBS-B} W_i)\|^2 \qquad \text{[Formula 4]}$$

In the following description, multiple base station uplink MIMO operation is explained.

First of all, if CL MIMO precoding is applied to a serving cell and a neighboring cell, single base station precoding can be performed together with multi BS coordination by combining two PMIs in TDD (time division duplex) or FDD (frequency division duplex) uplink transmission. One of the PMIs maximizes transmission power of the serving cell, while the other minimizes interference generated to the neighboring cell.

The PMI combination follows the following sequence.

Figure 2:
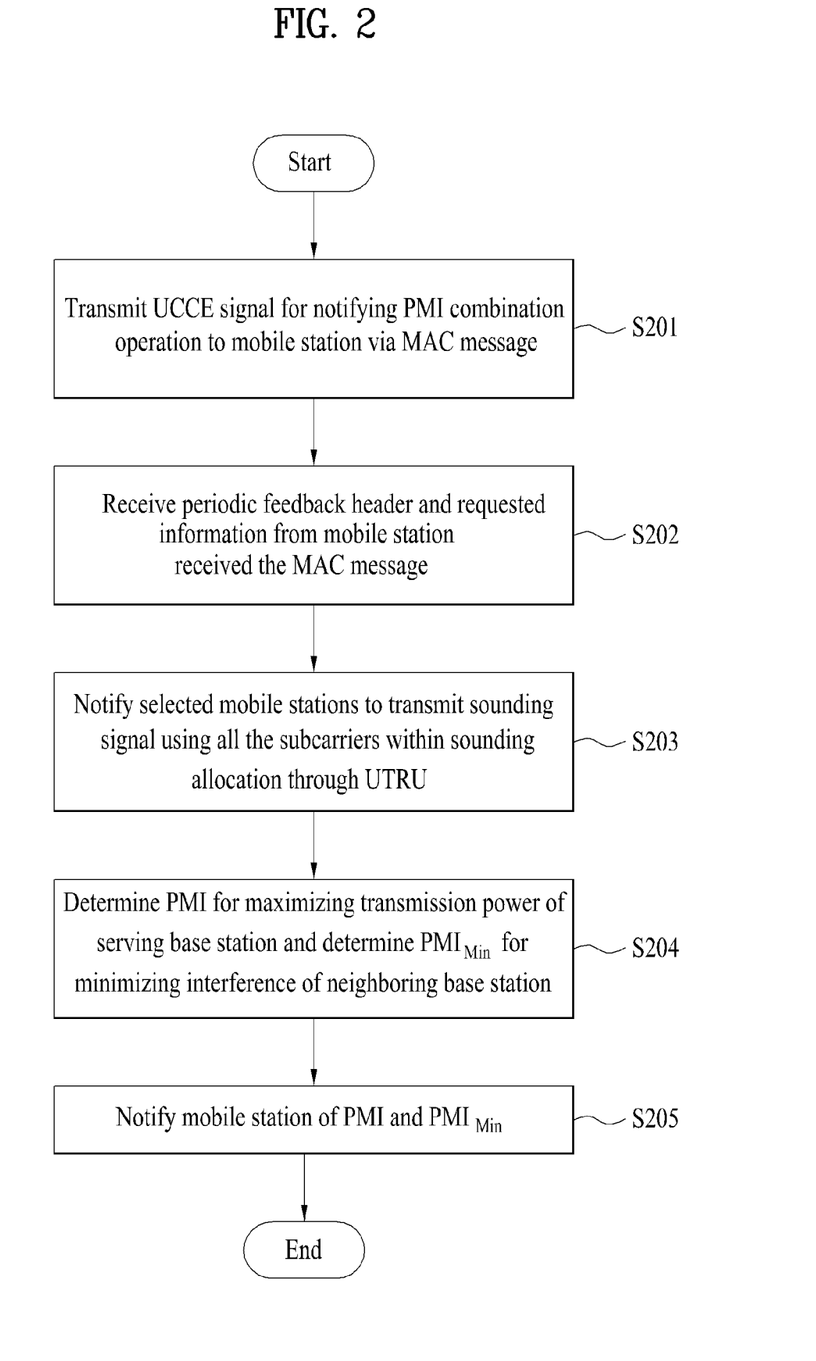
FIG. 2 is a flowchart for a method of notifying PMI relevant information to a user equipment in viewpoint of a base station in a multiple base station uplink MIMO.

FIG. 2 is a flowchart for a method of notifying PMI relevant information to a user equipment in viewpoint of a base station in a multiple base station uplink MIMO.

(1) PMI combination can be voluntarily initiated by a base station. Based on channel measurement, the base station is able to transmit a UCCE (uplink codebook coordination enable) signal for notifying PMI combination operation to a mobile station via a MAC (media access control, which is a higher layer) message [S201].

(2) From the mobile station having received the MAC control message, the base station receives a periodic feedback header together with the requested information [S202]. This information can contain Temp_BSID (Temp_Base station ID) and an RSSI (received signal strength indicator) difference level corresponding to the Temp_BSID.

The mobile station calculates a difference between two RSSIs received from a serving base station and a neighboring base station. If the RSSI difference value of the mobile station is smaller than a threshold value T, the mobile station is able to select a neighboring cell receiving a biggest interference via Formula 5.

$$P = \operatorname*{argmin}_{p \neq q}(RSSI_{p,i} - RSSI_{q,i}), \qquad \text{[Formula 5]}$$
$$\text{if } (RSSI_{p,i} - RSSI_{q,i}) < T$$

In Formula 5, the i indicates an index of a mobile station, the p indicates an index of a serving base station, and the q indicates an index of a neighboring base station. The $RSSI_{p,i}$ indicates an RSSI measured by a mobile station i from a preamble transmitted by a serving station p. And, the $RSSI_{q,i}$ indicates an RSSI measured by a mobile station i from a preamble transmitted by a serving station q.

After the neighboring base station has been selected, the mobile station i performs the procedure of Formula 6 to determine an RSSI difference level represented as $RSSI_{diff}$.

$$RSSI_{diff}=b1 \text{ if } (RSSI_{q,i}-RSSI_{p,i})>T_0$$
$$RSSI_{diff}=b2 \text{ if } (RSSI_{q,i}-RSSI_{q,i})<T0 \qquad \text{[Formula 6]}$$

In Formula 6, $T_0$ is greater than the T. And, the b1 and the b2 are values generated from quantizing the RSSI differences, respectively. Hence, at least one bit is required for feedback.

(3) After feedbacks have been received from a plurality of mobile stations, a serving station selects several mobile stations according to the number of mobile stations supported by RSSI difference level and sounding channel. The serving station has to notify the selected mobile station to transmit a sounding signal using all of the subcarriers within sounding allocation through UTRU (unit target resource unit) [S203]. Uplink sounding channel for a plurality of mobile stations in a plurality of cells can be multiplexed by cell cyclic shift separation and user cyclic shift separation instructed by control information (e.g., sounding command A-MAP IE (advanced-MAP information element) named in IEEE 802.16m).

(4) The PMI combination can be initiated by a base station in an unsolicited manner. A serving base station and a neighboring base station can measure channels of selected mobile stations by using uplink sounding signals. In performing the channel measurement, the serving base station and the neighboring base station can determine a PMI for maximizing transmission power of the serving cell and a $PMI_{Min}$ for minimizing interference generated to the neighboring cell, respectively [S204]. The neighboring base station is able to inform the serving base station of the $PMI_{Min}$ through backhaul network.

From the predefined codebook Wi, two PMIs can be selected according to Formula 7 and Formula 8.

$$PMI = \underset{i}{\arg\max}\|(H_s W_i)\|^2 \quad \text{[Formula 7]}$$

$$PMI_{Min} = \underset{i}{\arg\min}\|(H_I W_i)\|^2 \quad \text{[Formula 8]}$$

In formula 7 and Formula 8, $H_S$ and $H_I$ indicate channel information of a channel from a mobile station i to a serving base station and a channel information of a channel from the mobile station i to a neighboring base station, respectively. $v_i$ is the i-th codeword of the base codebook. Through Formula 7, PMI for maximizing reception performance of the serving base station is determined/found. Through Formula 8; $PMI_{Min}$ for generating minimum interference to the neighboring base station can be determined/found.

(5) The serving base station uses control information A-MAP IE to inform the mobile station of the PMI for maximizing the transmission power of the serving cell. And, the serving base station uses MAC (high layer) control message to inform the mobile station of the $PMI_{Min}$ [S205].

Figure 3:
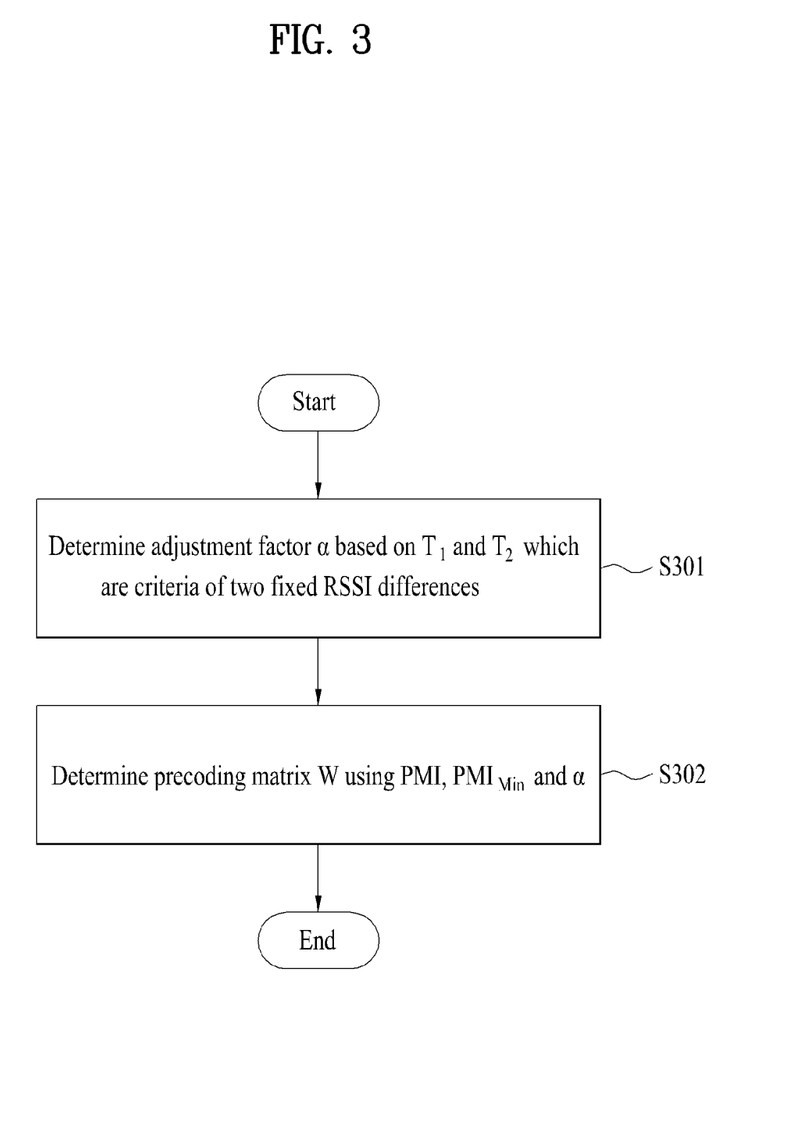
FIG. 3 is a flowchart for a method of determining a precoding matrix applied to an uplink transmission in viewpoint of a user equipment in a multiple base station uplink MIMO.

FIG. 3 is a flowchart for a method of determining a precoding matrix applied to an uplink transmission in viewpoint of a user equipment in a multiple base station uplink MIMO.

Referring to FIG. 3, based on $T_1$ and $T_2$ becoming criteria of two fixed RSSI differences, a mobile station determines an adjustment factor α [S301]. For example, the a ($K_1$, $K_2$, $K_3$) can be determined using Formula 9 in the following.

$$(RSSI_{p,i} - RSSI_{q,i}) \leq T_1, \alpha = K_1$$

$$T_1 \leq (RSSI_{p,i}) \leq T_2, \alpha = K_2$$

$$(RSSI_{p,i} - RSSI_{q,i}) > T_3, \alpha = K_3 \quad \text{[Formula 9]}$$

In Formula 9, the i indicates an index of a mobile station, the p indicates an index of a serving base station, and the q indicates an index of a neighboring base station. The indicates an RSSI measured by a mobile station i from a preamble transmitted by a serving station p. And, the $RSSI_{q,i}$ indicates an RSSI measured by a mobile station i from a preamble transmitted by a serving station q.

The mobile station generates a precoding matrix W by combining two precoding matrices ($W_{PMI}$, $W_{PMI_{Min}}$) together using the PMI and $PMI_{Min}$ received from the base station and the a found in the above step. Formula 10 illustrates a method of calculating the precoding matrix W.

$$W = \frac{\alpha \cdot W_{PMI} + (1-\alpha) \cdot W_{PMI_{Min}}}{\|\alpha \cdot W_{PMI} + (1-\alpha) \cdot W_{PMI_{Min}}\|}, 0 \leq \alpha \leq 1 \quad \text{[Formula 10]}$$

Since the aforesaid method has a considerable amount of operations that should be performed by the mobile station and the base station, it may not be preferable in aspect of system performance. Therefore, the present invention deals with a method of enhancing system performance by reducing the number of operations that should be performed by a mobile station and a base station.

In the above mentioned method, the base station separately announces the initiation of the PMI combination via UCCE and subsequent operations are then initiated. Yet, the present invention proposes the corresponding operation in a manner of announcing $PMI_{Min}$.

Moreover, in the above mentioned method, the mobile station informs the base station of the RSSI between the neighboring base station and the serving base station. The serving base station selects mobile stations using the RSSI. And, the serving base station announces information indicating where the sounding channel will be transmitted via UTRU.

Yet, in general cases, a mobile station announces channel information between the mobile station and a base station via a sounding channel with the base station. A good band varies according to a channel state to a serving cell rather than according to an operation on a neighboring cell. Accordingly, a serving base station informs the mobile station to transmit a sounding channel on a prescribed band. As these informations are shared with base stations, the neighboring base station is aware that a specific mobile station will transmit a sounding channel in a specific time via a specific band. The neighboring base station is able to acquire channel information between neighboring base stations from the mobile station by monitoring the corresponding band. In doing so, the neighboring base station is able to determine intensity of a reception signal.

Figure 4:
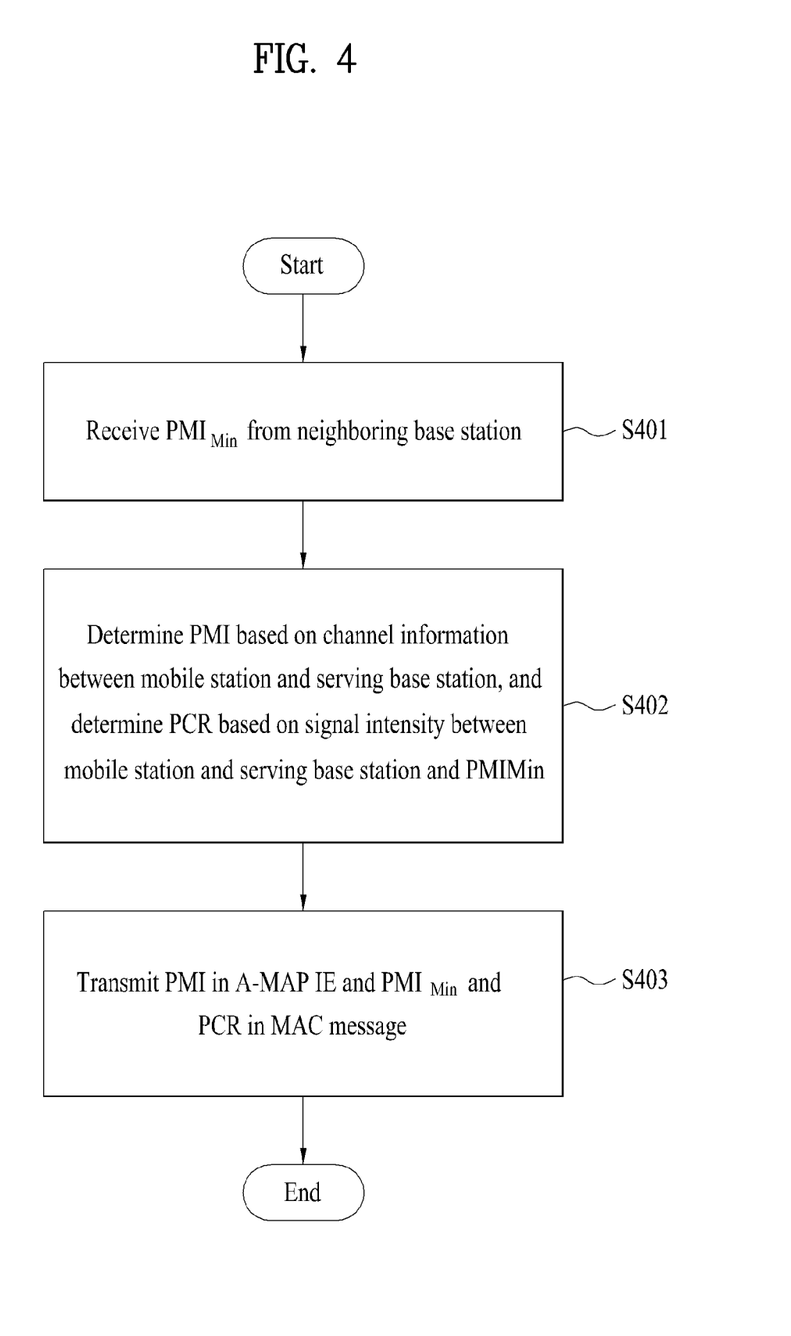
FIG. 4 is a flowchart for a method of transmitting a PMI relevant information to a user equipment in viewpoint of a serving base station in a multiple base station uplink MIMO according to one embodiment of the present invention.

FIG. 4 is a flowchart for a method of transmitting a PMI relevant information to a user equipment in viewpoint of a serving base station in a multiple base station uplink MIMO according to one embodiment of the present invention.

Referring to FIG. 4, a neighboring base station transmits such information as $PMI_{Min}$, a reception signal intensity and the like to a serving base station [S401].

The serving base station determines a PMI using channel information on a channel between the mobile station and the serving base station and determines a PMI combination ratio (PCR) using the information (for example, $PMI_{Min}$) received from the neighboring cell [S402]. The intensity of a reception signal between the serving base station and the corresponding mobile station may be used, too. In this case, the PCR can be set greater if performance of the serving base station is more important. In case of attempting to reduce interference with the neighboring base station, it is able to set the PCR smaller.

The serving base station uses A-MAP IE to transmit the PMI to the mobile station and also uses MAC (higher layer) control message to transmit the $PMI_{Min}$ and the PCR [S403].

Figure 5:
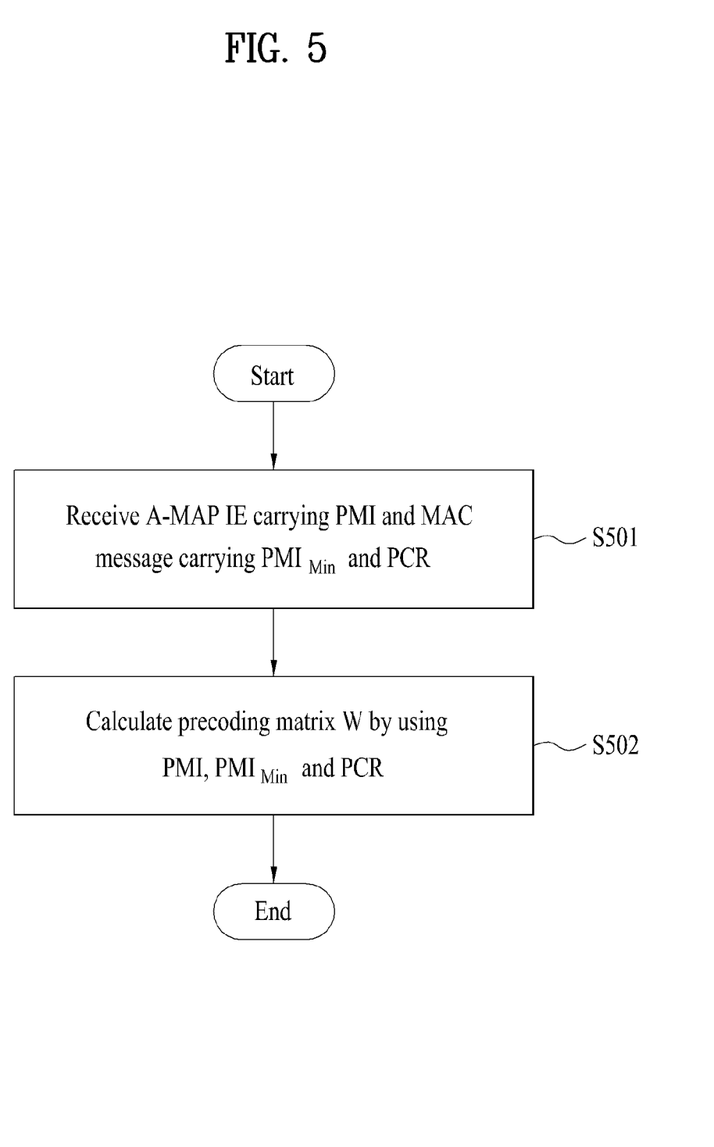
FIG. 5 is a flowchart for a method of determining a precoding matrix applied to an uplink transmission in viewpoint of a user equipment in a multiple base station uplink MIMO according to one embodiment of the present invention.

FIG. 5 is a flowchart for a method of determining a precoding matrix applied to an uplink transmission in viewpoint of a user equipment in a multiple base station uplink MIMO according to one embodiment of the present invention.

Referring to FIG. 5, a mobile station receives A-MAP IE carrying a PMI and also receives a MAC control message carrying $PMI_{Min}$ and PCR [S501]. The mobile station generates/determines/calculates a precoding matrix W using the PMI, the $PMI_{Min}$ and the PCR [S502]. The mobile station applies the precoding matrix W to uplink transmission. The mobile station precodes its uplink signal with the precoding matrix W, and transmits the precoded uplink signal to the serving base station.

The precoding matrix W is generated/determined/calculated by Formula 11.

$$W = \frac{PCR \cdot W_{PMI} + (1-PCR) \cdot W_{PMI_{Min}}}{\|PCR \cdot W_{PMI} + (1-PCR) \cdot W_{PMI_{Min}}\|}, \quad \text{[Formula 11]}$$

$$0 \leq PCR \leq 1$$

According to the method proposed by the present invention, operations performed by a serving operation are simplified. A mobile station just obtains W only using PMI, $PMI_{Min}$ and PCR received from the serving base station. Therefore, operations performed by the mobile station are simplified as well. Thus, overall operations of a system are simplified and the load of calculation performed by the mobile station is reduced. Consequently, overall system performance can be enhanced.

Figure 6:
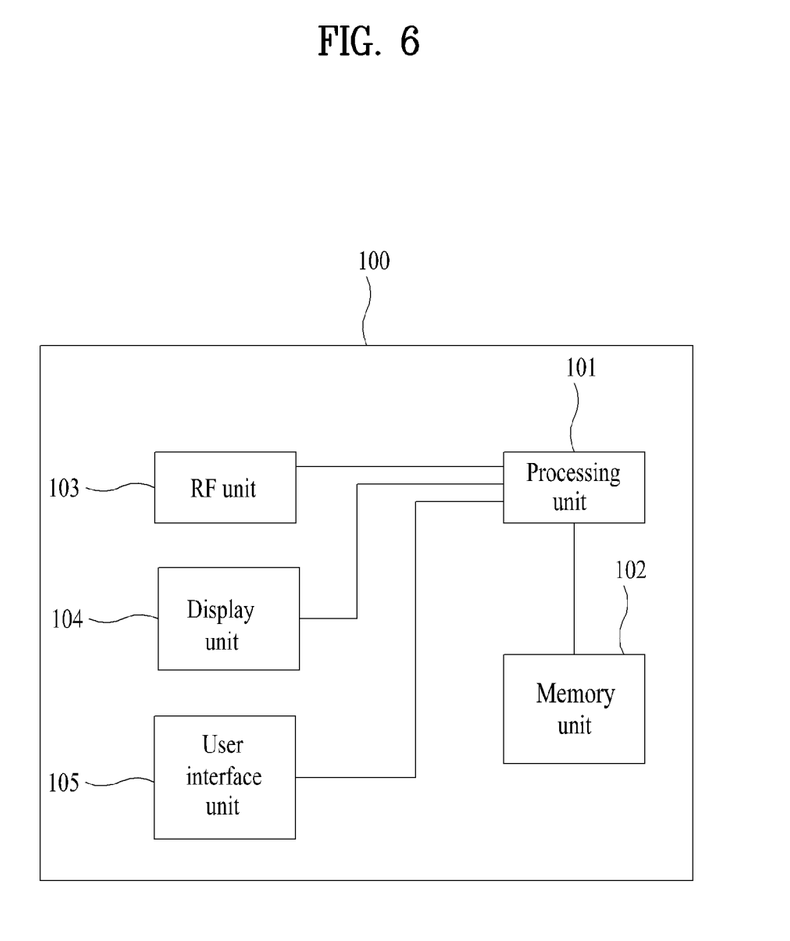
FIG. 6 is a block diagram of a configuration of a device applicable to a base station and a user equipment to implement the present invention.

FIG. 6 is a block diagram of a configuration of a device applicable to a base station and a user equipment to implement the present invention.

Referring to FIG. 6, a device 100 includes a processing unit 101, a memory unit 102 and an RF (radio frequency) unit 103. The device 100 can further include a display unit 104 and/or a user interface unit 105. The device 100 can be equipped in a base station or in a mobile station. A layer of a physical interface protocol is performed by the processing unit 101. The processing unit 101 provides a control plane and a user plane. A function of each layer can be performed by the processing unit 101. The processing unit 101 is able to perform the above described embodiment of the present invention. In particular, the processing unit 101 generates a user equipment location determining subframe or is able to perform a function of determining a location of a user equipment by receiving the subframe. The memory unit 102 is electrically connected to the processing unit 101. And, an operating system, applications and general files are stored in the memory unit 102. If the device 100 is a user equipment, the display unit 104 is able to display various kinds of informations. And, the display unit 104 can be implemented using a well-known LCD (liquid crystal display), an OLED (organic light emitting diode) display and the like. The user interface unit 105 can be configured by being combined with such a well-known user interface as a keypad, a touchscreen and the like. The RF unit 103 is electrically connected to the processing unit 101. The RF unit 103 transmits or receives a radio signal.

The processing unit 101, the memory unit 102, the RF unit 103 and the display unit 104 are operably coupled to each other, and the processing unit 101 controls the operations of the memory unit 102, the RF unit 103 and the display unit 104.

In a serving base station, the processing unit 101 can determine a PMI maximizing the transmission power of the serving cell to which the serving base station belongs. In a neighboring base station, the processing unit 101 can determine $PMI_{Min}$ minimizing interference generated to the neighboring cell, and inform the $PMI_{Min}$ to the serving station through the backhaul network. The processing unit 101 of the neighboring base station can control its RF unit 103 to transmit the $PMI_{Min}$ to the serving base station. The processing unit 101 of the serving base station can control its RF unit 103 to transmit the PMI, the $PMI_{Min}$ and a PCR to a mobile station. The RF unit 103 of the serving base station may receive the $PMI_{Min}$ transmitted from the RF unit 103 of the neighboring base station. The processing unit 101 of the serving base station can determine a PCR based on the PMI and/or signal intensity received from the mobile station, and the like. The processing unit 101 of the serving base station can generate control information element (e.g., A MAP-IE) containing the PMI and generate MAC (high layer) message containing the $PMI_{Min}$ and the PCR, and control the RF unit 103 to transmit the control information element and the MAC message to the mobile station.

In the mobile station, the RF unit 103 receives the PMI, the $PMI_{Min}$ and the PCR, transmitted from the serving base station, and transmit the PMI, the $PMI_{Min}$ and the PCR to the processing unit 101. The processing unit 101 can generate/determine/obtain a precoding matrix W for uplink transmission by using the PMI, the $PMI_{Min}$ and the PCR. The processing unit 101 precodes uplink data with the precoding matrix W, and control the RF unit 103 to transmit the precoded uplink data to the serving base station. The processing unit 101 can generate/determine/obtain the precoding matrix W by Formula 11.

The above-described embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together or in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

According to the present invention, 'user equipment' corresponds to a mobile station (MS). And, the mobile station (MS) can be replaced by such a terminology as a subscriber station (SS), a mobile subscriber station (MSS), a mobile terminal and the like.

Moreover, a user equipment of the present invention can include one of PDA (Personal Digital Assistant), cellular phone, PCS (Personal Communication Service) phone, GSM (Global System for Mobile) phone, WCDMA (Wideband CDMA) phone, MBS (Mobile Broadband System) phone and the like.

Embodiments of the present invention can be implemented using various means. For instance, embodiments of the present invention can be implemented using hardware, firmware, software and/or any combinations thereof.

In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

Accordingly, the present invention is applicable to a mobile station, a base station and other equipments of a wireless communication system.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of transmitting, by a base station, precoding information, which is for uplink transmission in a wireless communication system supporting multiple base station uplink MIMO (multiple input multiple output), the method comprising the steps of:
    determining a PMI (precoding matrix index) for maximizing transmission performance between a mobile station and the base station;
    receiving from a neighboring base station a $PMI_{Min}$ for minimizing interference between the mobile station and the neighboring base station; and
    transmitting to the mobile station the PMI, the $PMI_{Min}$, and a PMI combination ratio (PCR) being used in combining the PMI and the $PMI_{Min}$ for generating a uplink precoding matrix W.

2. The method of claim 1, wherein the PCR satisfies $0 \leq PCR \leq 1$.

3. The method of claim 1, wherein the PMI is transmitted via a control information element and the $PMI_{Min}$ and the PCR are transmitted via a MAC (media access control) message.

4. A method of determining, by a mobile station, a precoding matrix for uplink transmission in a wireless communication system supporting multiple base station uplink MIMO (multiple input multiple output), comprising the steps of:
    receiving from a serving base station a PMI (precoding matrix index) for maximizing transmission performance between the mobile station and the serving base station, a $PMI_{Min}$ for minimizing interference between the mobile station and a neighboring base station, and a PMI combination ratio (PCR) being used in combining the PMI and the $PMI_{Min}$; and
    generating a uplink precoding matrix W using the PMI, the $PMI_{Min}$ and the PCR.

5. The method of claim 4, further comprising:
    precoding uplink data with the uplink precoding matrix W; and
    transmitting the precoded uplink data.

6. The method of claim 5, wherein the PCR satisfies $0 \leq PCR \leq 1$.

7. The method of claim 4, wherein the PMI is received via a control information element and the $PMI_{Min}$ and the PCR are received via a MAC (media access control) message.

8. The method of claim 7, wherein the uplink precoding matrix W is generated as follows:

$$W = \frac{PCR \cdot W_{PMI} + (1-PCR) \cdot W_{PMI_{Min}}}{\|PCR \cdot W_{PMI} + (1-PCR) \cdot W_{PMI_{Min}}\|},$$

where the $W_{PMI}$ indicates a precoding matrix corresponding to the PMI, and the $W_{PMI_{Min}}$ indicates a precoding matrix corresponding to the $PMI_{Min}$.

9. A base station in a wireless communication system supporting multiple base station uplink MIMO (multiple input multiple output), comprising:
    a receiving unit configured to receive from a neighboring base station a $PMI_{Min}$ for minimizing interference between a mobile station and the neighboring base station;
    a processing unit, electrically connected to the receiving unit, configured to determine a PMI (precoding matrix index) for maximizing transmission performance between the mobile station and the base station; and
    a transmitting unit, electrically connected to the processing unit, configured to transmit to the mobile station the PMI, the $PMI_{Min}$, and a PMI combination ratio (PCR) being used in combining the PMI and the $PMI_{Min}$ for generating a uplink precoding matrix W, under control of the processing unit 10. The base station of claim 9, wherein the PCR satisfies $0 \leq PCR \leq 1$.

11. The base station of claim 9, wherein the processing unit is configured to control the transmitting unit to transmit the PMI via a control information element and control the transmitting unit to transmit the $PMI_{Min}$ and the PCR via a MAC (media access control) message.

12. A mobile station in a wireless communication system supporting multiple base station uplink MIMO (multiple input multiple output), the mobile station comprising:
    a receiving unit configured to receive from a serving base station a PMI (precoding matrix index) for maximizing transmission performance between the mobile station and the serving base station, a $PMI_{Min}$ for minimizing interference between the mobile station and a neighboring base station, and a PMI combination ratio (PCR) being used in combining the PMI and the $PMI_{Min}$; and
    a processing unit, electrically connected to the receiving unit, configured to generate a uplink precoding matrix W using the PMI, the $PMI_{Min}$ and the PCR.

13. The mobile station of claim 12, further comprising:
    a transmitting unit, electrically connected to the processing unit, wherein the processing unit is configured to precode uplink data with the uplink precoding matrix W, and to control the transmitting unit to transmit the precoded uplink data.

14. The mobile station of claim 13, wherein the PCR satisfies $0 \leq PCR \leq 1$.

15. The mobile station of claim 12, wherein the PMI is received via a control information element, and the $PMI_{Min}$ and the PCR are received via a MAC (media access control) message.

16. The mobile station of claim 15, wherein the processing unit is configured to generate the uplink precoding matrix W as follows:

$$W = \frac{PCR \cdot W_{PMI} + (1-PCR) \cdot W_{PMI_{Min}}}{\|PCR \cdot W_{PMI} + (1-PCR) \cdot W_{PMI_{Min}}\|},$$

where the $W_{PMI}$ indicates a precoding matrix corresponding to the PMI, and the $W_{PMI_{Min}}$ indicates a precoding matrix corresponding to the $PMI_{Min}$.

* * * * *